(12) United States Patent
Venkatanna et al.

(10) Patent No.: US 7,864,987 B2
(45) Date of Patent: Jan. 4, 2011

(54) METHODS AND SYSTEMS FOR SECURED ACCESS TO DEVICES AND SYSTEMS

(75) Inventors: Kumar Balepur Venkatanna, Bangalore (IN); Rajat Moona, Kanpur (IN); S V Subrahmanya, Bangalore (IN)

(73) Assignee: Infosys Technologies Ltd., Bangalore (IN)

( * ) Notice: Subject to any disclaimer, the term of this patent is extended or adjusted under 35 U.S.C. 154(b) by 1296 days.

(21) Appl. No.: 11/406,769

(22) Filed: Apr. 18, 2006

(65) Prior Publication Data

US 2007/0241861 A1 Oct. 18, 2007

(51) Int. Cl.
*G06K 9/00* (2006.01)

(52) U.S. Cl. ............... 382/115; 382/116; 382/128; 382/155; 382/224; 235/380; 340/5.52; 340/5.53; 704/246; 704/247; 704/248; 704/249; 704/250; 902/35; 713/186

(58) Field of Classification Search ............ None
See application file for complete search history.

(56) References Cited

U.S. PATENT DOCUMENTS

| | | | |
|---|---|---|---|
| 5,280,527 A | 1/1994 | Gullman et al. | |
| 6,219,439 B1 | 4/2001 | Burger | |
| 6,434,259 B1 | 8/2002 | Hamid et al. | |
| 6,757,596 B1 | 6/2004 | Moberg | |
| 6,793,134 B2 | 9/2004 | Clark | |
| 6,867,683 B2 * | 3/2005 | Calvesio et al. ........... | 340/5.52 |
| 6,871,287 B1 | 3/2005 | Ellingson | |
| 6,877,097 B2 | 4/2005 | Hamid et al. | |
| 7,490,242 B2 * | 2/2009 | Torres et al. .............. | 713/182 |
| 2002/0188854 A1 * | 12/2002 | Heaven et al. ............ | 713/186 |
| 2003/0229492 A1 | 12/2003 | Nolan | |
| 2004/0010724 A1 * | 1/2004 | Brown et al. ............. | 713/202 |
| 2004/0015243 A1 | 1/2004 | Mercredi et al. | |
| 2004/0153656 A1 * | 8/2004 | Cluts et al. ............... | 713/186 |
| 2005/0087597 A1 | 4/2005 | Gotfried et al. | |
| 2005/0238207 A1 * | 10/2005 | Tavares .................... | 382/115 |
| 2006/0041756 A1 * | 2/2006 | Ashok et al. ............. | 713/183 |
| 2008/0101658 A1 * | 5/2008 | Ahern et al. .............. | 382/115 |

FOREIGN PATENT DOCUMENTS

JP 2006071967 A * 3/2006

OTHER PUBLICATIONS

Moona, "Smart Cards: Technology for Secure Management of Information," Cutting Edge Workshop, IIT Kanpur, Apr. 8-9, 2005, 36 pages.

(Continued)

*Primary Examiner*—Samir A Ahmed
*Assistant Examiner*—John W Lee
(74) *Attorney, Agent, or Firm*—Klarquist Sparkman, LLP

(57) ABSTRACT

An access system in one embodiment that first determines that someone has correct credentials by using a non-biometric authentication method such as typing in a password, presenting a Smart card containing a cryptographic secret, or having a valid digital signature. Once the credentials are authenticated, then the user must take at least two biometric tests, which can be chosen randomly. In one approach, the biometric tests need only check a template generated from the user who desires access with the stored templates matching the holder of the credentials authenticated by the non-biometric test. Access desirably will be allowed when both biometric tests are passed.

21 Claims, 10 Drawing Sheets

OTHER PUBLICATIONS

Tech Support Security Concept, Security Concepts, I/O Software website (www.iosoftware.com/pages/Support/Security+Concepts/index.asp), archived Apr. 6, 2005, 2 pages.

I/O Software website: http://www.isosoftware.com/pages/Support/Authentication%20Basics/index.asp, 17 pages, last viewed Jul. 12, 2005.

I/O Software, "Security Concepts," 14 pages.

International Biometric Group, "Lessons Learned from Comparative Biometric Testing," Copyright 2003 International Biometric Group, www.biometricgroup.com, 27 pages.

Considerations and Concepts, The Trusted Traveler Program, Improving Air Travel Security, Report to the U.S. General Accounting Office, Sep. 3, 2002, I/O Software, 23 pages.

* cited by examiner

METHODS AND SYSTEMS FOR SECURED ACCESS TO DEVICES AND SYSTEMS

BACKGROUND

Mankind has always been interested in security. The first known lock—estimated to be 2,800 years old—was discovered just outside the ruins of Khorsabad palace near Nineveh, in Modern-day Iraq. Biometric testing seems to have been invented by the Chinese around 1400 A.D., where an explorer observed people inking children's feet and hands, and then stamping them on pieces of paper, creating an accurate identification system.

Since then, security systems have continued to improve. Today, not only doors are locked; information, too, is locked away, with the key commonly being a password. Passwords have their own difficulties. Passwords that are easy to remember are also easy to be discovered by trial and error methods. Safer passwords—because they are longer, contain numbers and special characters, etc., are quite difficult to remember and so often are written down, leading to a different sort of security breach. Passwords can also be inadvertently disclosed—e.g., they can be viewed when they are being typed in.

Security cards, often combined with passwords (or PINS—short, numeric passwords) are also commonly used, and present similar security problems to passwords; that is, the cards can be stolen or lost; the passwords associated with them tend to either be easy to remember (and, therefore, easy to crack) or long and complicated, which leads them to being written down, often on the card itself.

As locks get more sophisticated, so do the lock breakers. One common method to gain entrance to password-protected data is "phishing", where an untrustworthy person masquerades as a legitimate business. Commonly, such "phishers" send an official looking e-mail (or an instant message, or a letter) requesting password information. Sometimes, they present screens to the user representing a trusted entity, which legitimately needs the password.

To counter these problems, biometric methods—physiological and behavioral characteristics used to verify identity—are increasingly being used. For example, biometric fingerprint information (probably the best-known physiological biometric data) is gaining acceptance as a method of verifying identity. Fingerprint readers as small as a pack of cards have been developed, and the verification process (pressing one's finger against a platen) is seen as harmless. Iris pattern recognition (matching the unique pattern in the colored portion of the eye that surrounds the pupil) is also used, and systems exist that can perform face recognition, often emphasizing areas difficult to alter, such as the eye socket upper outline, the sides of the mouth, and the planes of the face around the cheekbones.

However, biometric data, unlike passwords and keys, can only authenticate someone up to a confidence level; that is, a biometric system will give a certain percentage of false matches, false negatives, and will fail to enroll a certain percentage of each test population. There are people who cannot enroll in certain biometric systems due to their biological "sample quality". For example, some fingerprints are too smooth to give clear-enough samples to create clear-enough templates to effectively use.

Certain medications can also make biometric test results unreliable. For example, there are drugs, such as atropine, that dilate the eye, making iris identification impossible. Also, certain illnesses can lead to a user falsely being rejected by a biometric system. Having a head cold may change a user's voice sufficiently that he or she will be rejected by a voice-recognition system. Therefore, not all people can be enrolled or can use each biometric test.

SUMMARY

Additional features and advantages will become apparent from the following detailed description of illustrated embodiments, which proceeds with reference to accompanying drawings.

This summary is provided to introduce a selection of concepts in a simplified form that are further described below in the Detailed Description section. This summary does not identify required or essential features of the claimed subject matter.

One embodiment comprises a method of allowing user access. A role is defined for a user, and then non-biometric confidence scores of randomly chosen successive non-biometric user tests are added until a non-biometric confidence threshold is reached or a non-biometric test limit is reached. Then, biometric confidence scores of successive randomly chosen biometric tests are added until a biometric confidence threshold is reached or a biometric test limit is reached. If the non-biometric confidence threshold is reached and the biometric confidence threshold is reached, then, in this embodiment, at least some access is allowed based in part upon the user role that was defined earlier.

Another embodiment comprises a first non-biometric test mechanism operationally able to analyze input data to determine if a first non-biometric test has been successfully executed; a first unlocker, which allows access to at least a first portion of the device or site when the non-biometric test mechanism is successfully executed; a biometric test mechanism operationally able to analyze input data to determine biometric success or biometric failure; and a second unlocker, which, in this embodiment, allows access to at least a second portion of the device or site when the first biometric test mechanism is successfully executed. Furthermore, the biometric test mechanism desirably comprises at least two biometric tests, each with a confidence level. For each biometric test, a user test score is combined with the confidence level to create a scaled test score. The scaled test score of each biometric test is summed, and only if the total sum of the scaled test scores reaches a biometric confidence threshold will the biometric test mechanism determine biometric success. Access is allowed when the user passes the non-biometric test and the biometric tests.

In an additional embodiment, in response to non-subjective user data, at least one randomly chosen non-subjective test is given which produces either a pass or a fail. This is used to establish credentials of the user. In response to subjective user data, at least two randomly chosen subjective tests are given to a user desiring access, each subjective test generating a subjective score. These subjective tests establish the identity of the user. The cumulative subjective score on the subjective tests must reach a confidence threshold to establish identity of the user. At least one subjective test compares the subjective user data with previously-stored data associated with the user whose credentials have been established to determine the subjective score of the test. If both the credentials of the user are established and the identity of the user is established then user access is allowed.

Additional features and advantages will become apparent from the following detailed description of illustrated embodiments, which proceeds with reference to accompanying drawings.

DETAILED DESCRIPTION

The present application relates to technologies for allowing access using non-biometric and biometric tests. Described embodiments implement one or more of the described technologies.

Various alternatives to the implementations described herein are possible. For example, embodiments described with reference to flowchart diagrams can be altered, such as, for example, by changing the ordering of stages shown in the flowcharts, or by repeating or omitting certain stages. As another example, although some implementations are described with reference to specific non-biometric and biometric tests, forms of non-biometric and biometric tests also can be used.

I. Overview

Figure 1:
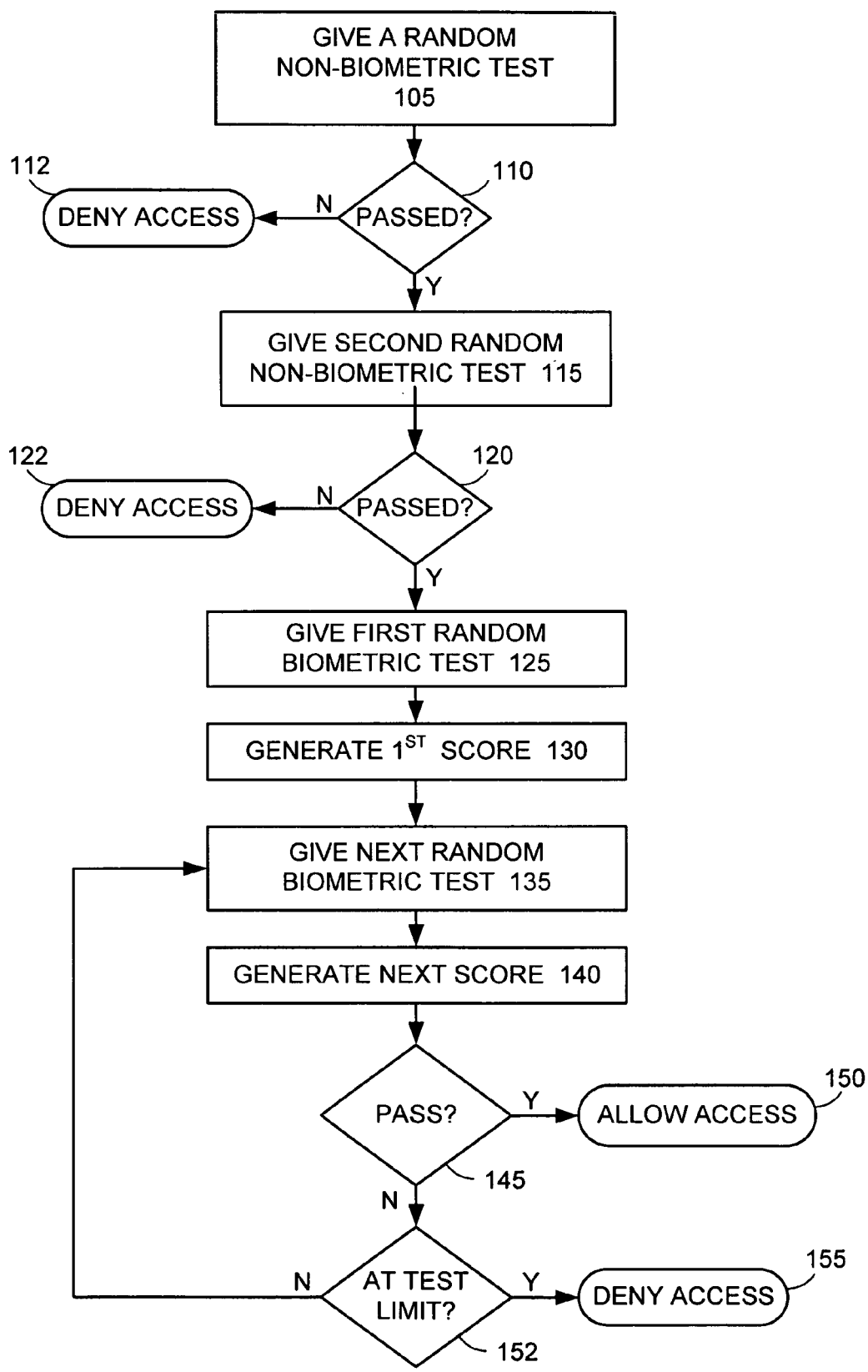
FIG. 1 is a flow diagram of an exemplary process flow in conjunction with which described embodiments can be implemented.

FIG. 1 shows an overview of exemplary embodiments that can be used to accurately determine identity and allow access using a combination of non-biometric and biometric tests. At process block 105, a non-biometric test is chosen, and desirably is randomly chosen.

The non-biometric test can be any type of such test. In addition, more than one such non-biometric test can be performed at this stage. Exemplary forms of non-biometric tests are described below.

The most common form of non-biometric authentication is, most likely, a password-based test. In such a test, the user types or otherwise enters a password into an authentication device. Sometimes the user chooses such passwords initially, and sometimes they are assigned. Passwords suffer from many problems, as anyone who has ever used one knows. For example, someone might give his or her password to a trusted friend or colleague who then might misuse it. Passwords that consist of actual words can be discovered using a brute-force attack (that is, using a computer, a hacker can present every word in the dictionary to attempt to gain illegal entry into a password-protected system). If the password is random enough to prevent a brute-force attack, it is generally so difficult to remember that it must be written down somewhere, allowing those with bad intent to discover it and use it to break into the system.

More problematically, users often use the same password at many sites—once a given password is discovered for a user, it can often be used to break into other known user locations.

Furthermore, a password can be harvested between the time a user types or otherwise enters the password into a device and when the password reaches the server from an off-site location, or can be gathered by malicious hardware, software, firmware, or some combination of the three residing on what are believed to be safe terminals.

Short, numeric passwords are commonly known as Personalized Identification Numbers (PINs). PINs are commonly used in Automatic Transaction Machines (ATMs), mobile phones, internet-based access to personalized information, etc. In many systems there is a hierarchy of such PIN-based authentication (for example, maintenance PIN vs. user PIN) and based on one or more successes in the PIN authentications, restricted sets of one or more privileges are granted to the user. This mechanism is used primarily to establish a user's identity. However, such a mechanism lacks the ability to distinguish a user uniquely. A user may share his PIN with others, as an example, thereby giving them the same privileges.

Offering more protection than a password are cryptography-based tests. In such a test, the validity of a user (in reality the key being validated) is established using the fact that the two parties know a common secret, but never share the secret, so that the secret is not exposed when being transmitted over a network. The secret can be a cryptographic key, a mechanism to obtain such a key, or a mechanism, whereby the secret is created using public knowledge of the other partner (such as in a Public Key Infrastructure (PKI)).

One algorithm used to create such locking and unlocking mechanisms is the Diffie-Hellman key exchange, which allows users to establish a shared secret key over an unprotected communications channel without using a prior shared secret. Another algorithm, RSA, created by Rivest, Shamir and Adelman, exploits the difficulty of factoring extremely large primes to provide both encryption and decryption. Other methods of safely sharing secrets include the ElGamal cryptosystem invented by Tamir Elgamal; The Digital Standard Algorithm (DSA), developed by the National Security Agency (NSA); and a whole family of algorithms based on elliptic curve cryptography such as Elliptic Curve Diffie-Hellman (ECDH), Elliptic Curve Menezes-Qu-Vanstone (ECMQV), and the Elliptic Curve Digital Signature Algorithm (ECDSA), to name a few.

Such tests are the basis of Smart-card technology. A Smart card is a credit card-sized card with a secure microcontroller containing a secret key. Generally, to use a Smart card, the user presents the card to an access device and inputs a PIN. A random number is then passed to the Smart card by the access device. The random number is then algorithmically combined with the PIN to produce an answer. If the answer is correct, access is allowed. This mechanism is used primarily to establish a key holder's authority and to ensure the genuineness of the secret storage system.

Universal Standard Bus (USB) tokens can also be used in place of Smart cards. USB tokens are generally devices embedded with the same types of microcontrollers used by Smart cards. They are generally roughly equivalent in size to a key, can generally be placed on a keychain, and are plugged into the USB port of a device. These tokens quite often do not require a PIN to activate their secret, and so can be used with devices that do not have a user interface. However, like Smart cards, USB tokens can be misplaced, and those that do not require a PIN are open to exploitation by being deliberately stolen.

Digital signature tests authenticate identity by exploiting the fact that only a specific user is issued a specific secret. A trusted third party is used to verify that only a specific entity has been issued the secret in question. For further validation, the digital signature often is composed of two algorithms: one used for the signature, and one used in the verification process. Digital signatures generally contain embedded within them personal information, such as a name, a serial number, the digital signature public key, and a separate digital signature containing information about the certifying authority, which may be used to ensure the validity of the signature.

Other non-biometric tests are also available. For example, a user may possess a device that generates a brand-new password at each use; the user would then type that password into an authentication device. This thwarts certain sorts of password theft—the resulting password, if stolen, would be useless on the second try.

Non-biometric tests register either a pass or a fail. Either the password or secret is known or it is not. At decision block 110, the test is checked to see if it was passed or failed. If failed, at process block 112 the user is denied access. If passed, an additional one or more non-biometric test, for example, a second non-biometric test, is chosen (desirably randomly) at optional process block 115. If the non-biometric test is chosen randomly, then it is desirably randomly chosen from a limited number of tests. In one embodiment, the non-biometric test is randomly chosen from two possible non-biometric tests. The requirement for at least two non-biometric tests thwarts the interloper who has obtained one form of non-biometric identity information. At process block 120, the results of the second non-biometric test are checked. If the test was failed, at process block 122 the user is again denied access. There might be further ramifications, in that an alarm system might go off, doors might be locked, previously allowed areas might no longer allow access, and so on.

If the second or other subsequent test is passed, control passes to process block 125 where at least one biometric test is chosen, desirably randomly, and then given to a user. If the biometric test is chosen randomly, then it is desirably randomly chosen from a limited number of tests. In one embodiment, the biometric test is randomly chosen from two possible biometric tests. For example, the limited number of biometric tests might be ten fingerprint tests; one for each of the ten fingers. The left-hand ring finger might be chosen for the first biometric test, with the thumb of the right hand chosen for the second biometric test. A score is then generated 130. Since an identity, or a partial identity has already been established for the user-at-hand via the initial non-biometric test or tests, the biometric tests will, in a desirable embodiment, only check templates associated with that specific individual against the new sample. This greatly reduces verification time and leads to a lesser number of false positives and false negatives.

The biometric test can be any type of such test. In addition, more than one biometric test can be performed at this stage. Exemplary forms of biometric test are described below.

The number of biometric tests continues to expand. Currently, some of the biometric tests suitable for use with the embodiments comprise the following: fingerprint tests, voice recognition systems, handprint recognition tests, face recognition tests, handwriting recognition tests, voice recognition tests, iris recognition tests, retinal scan tests, eye blinking rate tests, eyeball squint extent tests, normalized body temperature tests, keystroke dynamic tests, vein recognition tests, and Deoxyribonucleic acid (DNA) recognition tests, to name a few.

The most widely recognized, and the oldest (in the West, at least), biometric test is the fingerprint test. Fingerprints are, by and large, unique. Furthermore, they stay constant with age and, when a finger is damaged, a recognizable fingerprint is typically restored when the finger is healed. Generally, in an enrollment process, a fingerprint is captured by pressing it up against a plate and having it scanned—a very non-invasive process. Image processing algorithms can be used to electronically eliminate (heal) the effect of temporary cuts or blemishes on the finger that might not always be present, and to clarify any smudged areas. The fingerprint is then stored as a template. When someone needs to be authenticated, the process is repeated: that is, another fingerprint image is obtained; the image processing algorithms again clarify the image, and then the processed image is compared to a database of existing fingerprint templates. If a close-enough match is found, then the degree of similarity between the authenticating fingerprint and the template can be assigned a value, such as a number, as a marker of the degree of confidence that the fingerprint is actually from the identified individual.

Facial recognition tests are also used to authenticate users. This method is even less invasive than fingerprint recognition, and can be performed without the test-taker's knowledge. It is based on the idea that certain parts of the face are not susceptible to change, such as the area around the upper portion of the eye, the area around the mouth, and the area around the cheekbones.

Voice recognition systems are also used to authenticate users using voice characteristics. The shape of an individual larynx leads to individual features, such as pitch and tone; when harmonics (determined largely by head shape) and cadence is added a unique signature can be obtained. This is also seen as non-invasive, as people generally do not mind speaking to a device. Problems with speech, such as a head-cold, laryngitis, or a bad sinus infection can lead to failures, however.

Hand geometry tests are based on the fact that hand shape is more-or-less unique and remains constant for life. Typically, hand recognition tests require that a user line up his or her hand using guide-pegs—five, for finger placement, is common. A three-dimensional image, which includes hand shape, knuckle shape, and length and width of each of the fingers, is then captured. Although not particularly obtrusive, hand geometry tests currently have a high false-acceptance rate, which should be ameliorated by at least some of these embodiments, as only a specific hand template (for an individual determined by the non-biometric tests) will be considered for a match.

Iris recognition tests are based on the theory that the stromal pattern of an individual iris (the coloring) is unique. For example, identical twins have noticeably different stromal patterns, and each individual has different patterns in left and right eyes. A small camera takes a picture of the iris, which is then compared to a previously acquired template.

Retinal scan tests map the pattern of blood vessels on the back of the eye. They do this by sending a low-intensity beam of light through the pupil. This test is quite invasive, in that users must keep their eyes motionless and unblinking within a half inch of the device. Furthermore, other information, such as various health issues, can be gleaned. However, such tests provide about 400 points of reference and have a very low false negative rate.

Keystroke dynamics refer to a test that precisely analyzes the speed and rhythm that someone types. This is done by monitoring the keyboard input multiple times a second, to give an accurate accounting of "flight time"—how long a user spends reaching for a specific key, and "dwell time"—how long a user spends pressing a given key. This method requires no extra test hardware other than a keyboard.

Biometric tests, unlike non-biometric tests, do not give straight up or down verification responses. Rather, the best they can do is to give a confidence level—that is, within a certain degree of certainty, they can say that a person passed or failed a certain biometric test. The failures, both for false acceptances and for false rejections are called the false acceptance rate and the false rejection rate. Due to the vagaries of the human physiognomy, certain people have a more difficult time with certain tests than others do. Other problems may bedevil biometric tests. For example, someone with laryngitis is unlikely to pass a voice recognition system due to no fault of his or her own. Therefore, rather than unequivocally failing someone who fails a specific test (or at least fails to pass with a sufficiently high confidence score) an additional one or more biometric tests can be given. In accordance with FIG. 1, at block 135, at least one additional biometric test (e.g., a second such test) is desirably randomly chosen. In an exemplary embodiment, the biometric test is randomly chosen from a group containing or comprising a limited number of possible biometric tests. The previously-chosen biometric test, in some embodiments, is taken out of the group of the limited number of possible biometric tests such that the same test is not administered twice. At process block 140, a score is generated from the second biometric test. The scores from the biometric test at blocks 125 and 135 are combined and the combined scores are then evaluated to see if a satisfactory level of confirmation of identity is achieved by the biometric tests. The evaluation determines if the correlation between the biometric test scores and the individual sought to be identified is high enough. Desirably, the biometric test scores are arithmetically combined, such as added together, and compared to a threshold that can be predetermined or varied. For example, if at blocks 125 and 135, two biometric tests have been administered, the two scores are combined, and, at decision block 145, if the combined score is sufficient to pass, at process block 150, access is allowed. If they are not, processing continues at decision block 152, where it is checked if the user has made the maximum number of test attempts. If not, at process block 135, a subsequent test is allowed. Otherwise, if the maximum number of attempts has been reached, then at process block 155, access is denied.

This is just a brief overview of a single embodiment; other embodiments are discussed below.

II. Exemplary Method for Allowing Access Using Non-Biometric and Biometric Tests Turning to FIG. 2A, an exemplary method for allowing user access is described. At optional process block 205, a user role is defined. The user role may be defined for each user in a system. Users can have roles based on a job description, or other factors, or combinations thereof. For example, one user may have the role of "system administrator." Certain roles may require limited access even if all tests are passed. For example, in a car-access method, someone too young to drive a car may have the role "juvenile". A person with such a role will be denied driving privileges. In at least some embodiments, the user role definition is a function of at least one test being passed.

In an alternate embodiment, the user role is partially defined by the first non-biometric test score, and is thereafter refined by each subsequent non-biometric and biometric test score. In yet another alternate embodiment, the user role is refined by some subset of the test scores.

At process block 207, at least one non-biometric test is chosen, desirably randomly. The initial choice of which non-biometric tests to use may be based on the level of security provided by the test, ease of use, the role definition, convenience, and so forth.

At decision block 209 the user takes the test or tests, generating a pass or a fail. At decision block 211 it is determined if the user failed the test. If so, then access is denied 213. In other embodiments, the user is allowed to fail a certain number of non-biometric tests before being denied access. If the user passed the test or tests, then at decision block 215 it is determined if a non-biometric confidence threshold score has been reached. This confidence threshold can be based on the number of tests that have been passed, the difficulty of passing the tests, and so on. The confidence threshold is desirably based on the fact that different non-biometric tests have variable security levels. Each test passed can generate a non-biometric confidence score. The results can be combined, such as summed, with the combined biometric confidence scores being then compared to a non-biometric confidence target, such as a threshold, to determine if the user has successfully passed the non-biometric tests. Since a password generally is less secure than a Smart card with a PIN, successfully executing a password in this example will generate a lower confidence score than will a more secure test, such as presenting a Smart card with a PIN.

If the non-biometric confidence threshold has not been reached, then, returning to process block 207, another non-biometric test is chosen, and the process continues. Each time a test is successfully passed, a user role may be defined with greater precision. The role of the user at a certain stage might also affect the next test that is given. The fact that a test has been successfully passed may also at least partially define a role of a user. The number of non-biometric tests can be limited, such that failure to achieve the requested confidence after a number of tests results in exiting the process. If the confidence threshold has been reached, then limited access may be allowed at block 217. Examples of such limited access include unlocking the doors on a car, allowing access to a formerly-forbidden room, allowing access to a formerly-forbidden portion of a computer, and so on. Alternatively, there may be no access based on passing of one or more non-biometric tests, but instead, a user may now be qualified to take one or more biometric tests based on having passed the non-biometric tests.

Figure 2A:
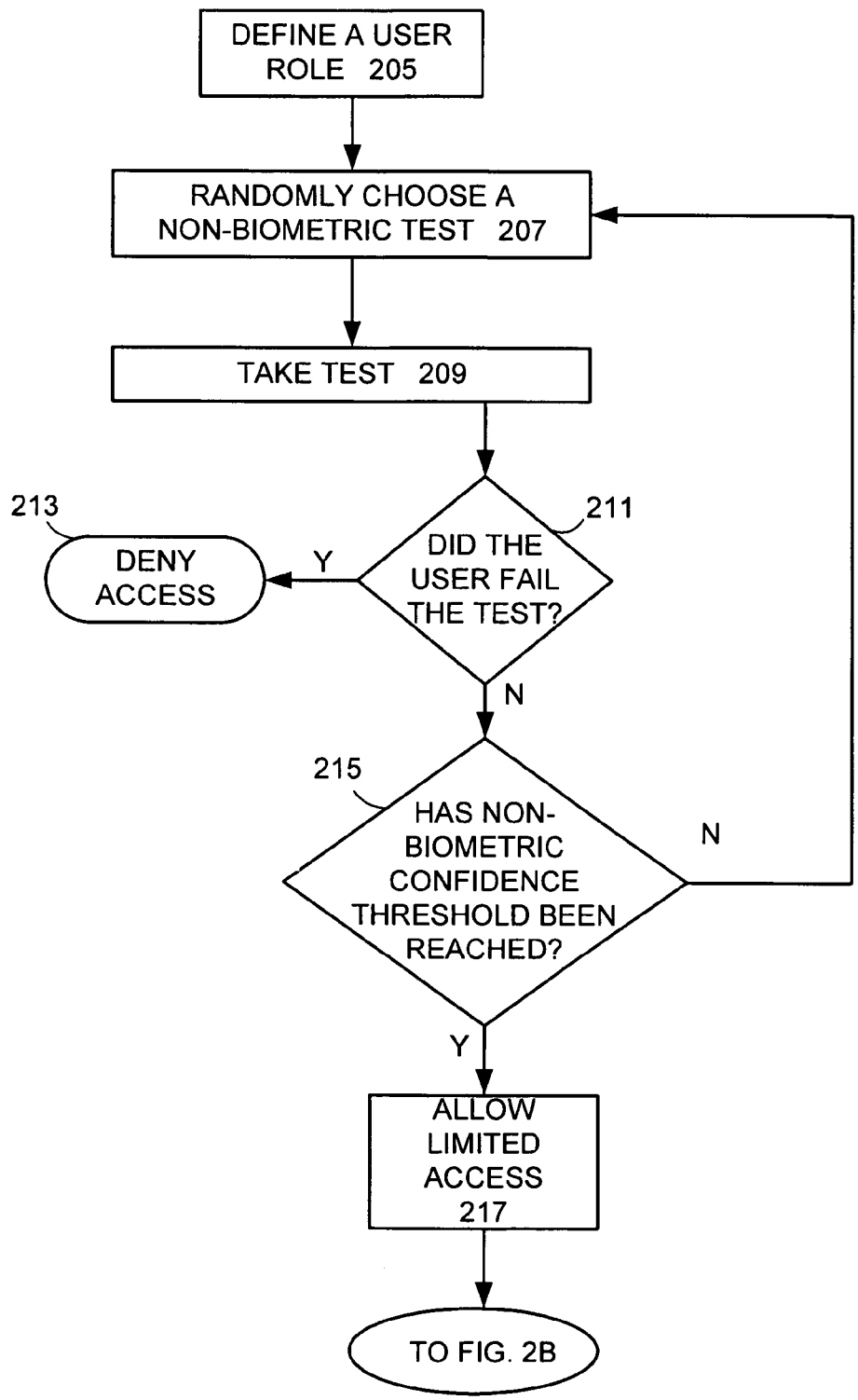
FIG. 2A is an operational flow diagram showing an exemplary embodiment of a method of using non-biometric testing in conjunction with which described embodiments can be implemented.
Figure 2B:
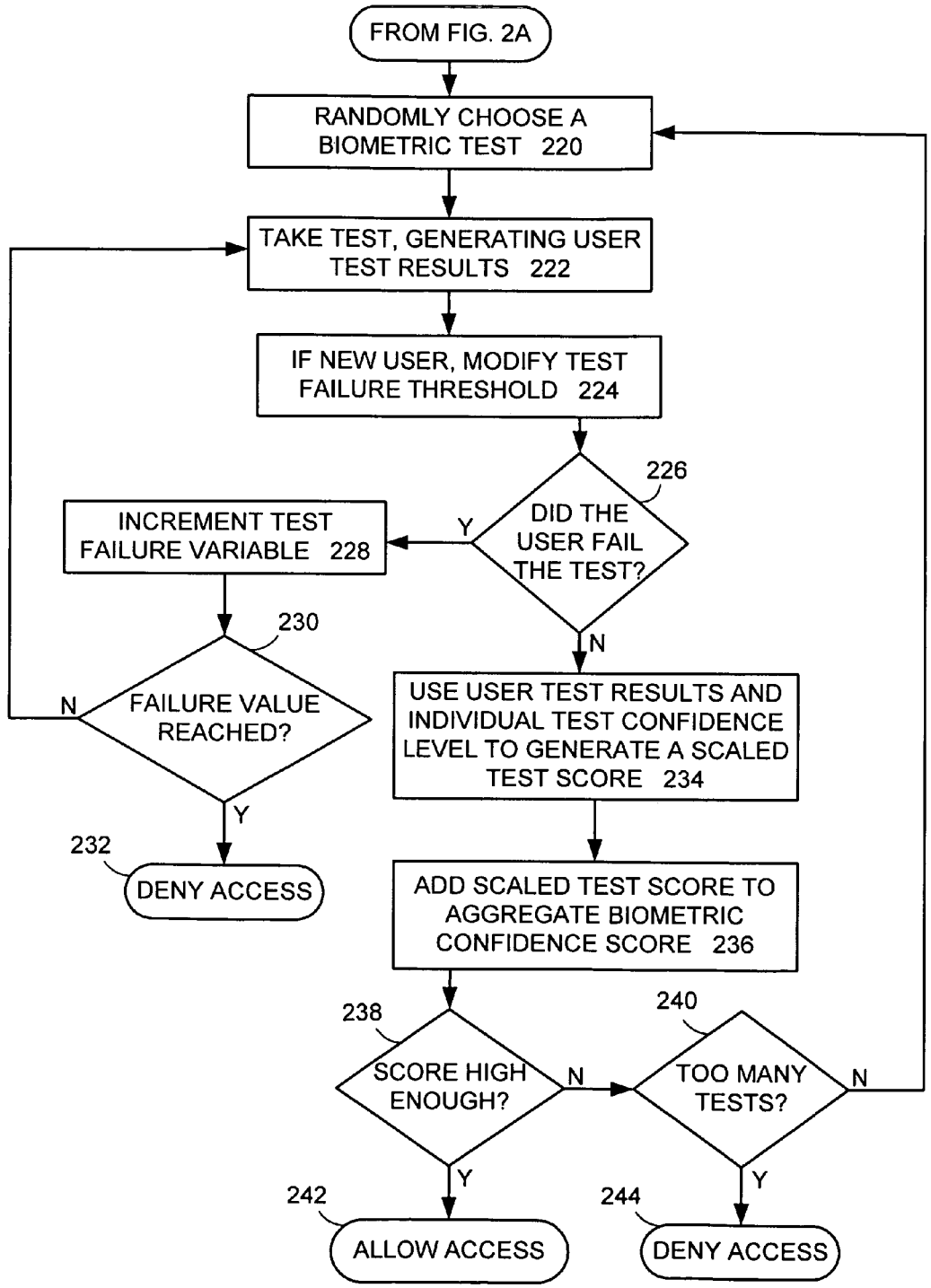
FIG. 2B is an operational flow diagram showing an exemplary embodiment of a method of using biometric testing in conjunction with which described embodiments can be implemented.

Turning to FIG. 2B, which continues the example of FIG. 2A, at process block 220, at least one biometric test is chosen, desirably randomly. The initial decision of what biometric test or tests to use can be based on one or more factors, or combinations thereof, such as whether the users are aware of their participation, how cooperative the users are, whether or not a user is supervised when using the system, the user role that has been defined or partially defined by non-biometric tests that have been passed, the nature and number of non-biometric and/or non-biometric tests that have been previously passed, the levels of the tests that have been passed, how trained the user is on specific tests within the system, and if there are environmental factors that affect performance, such as noise with a voice recognition system, or dirt or soot with a fingerprint recognition system.

Figure 2C:
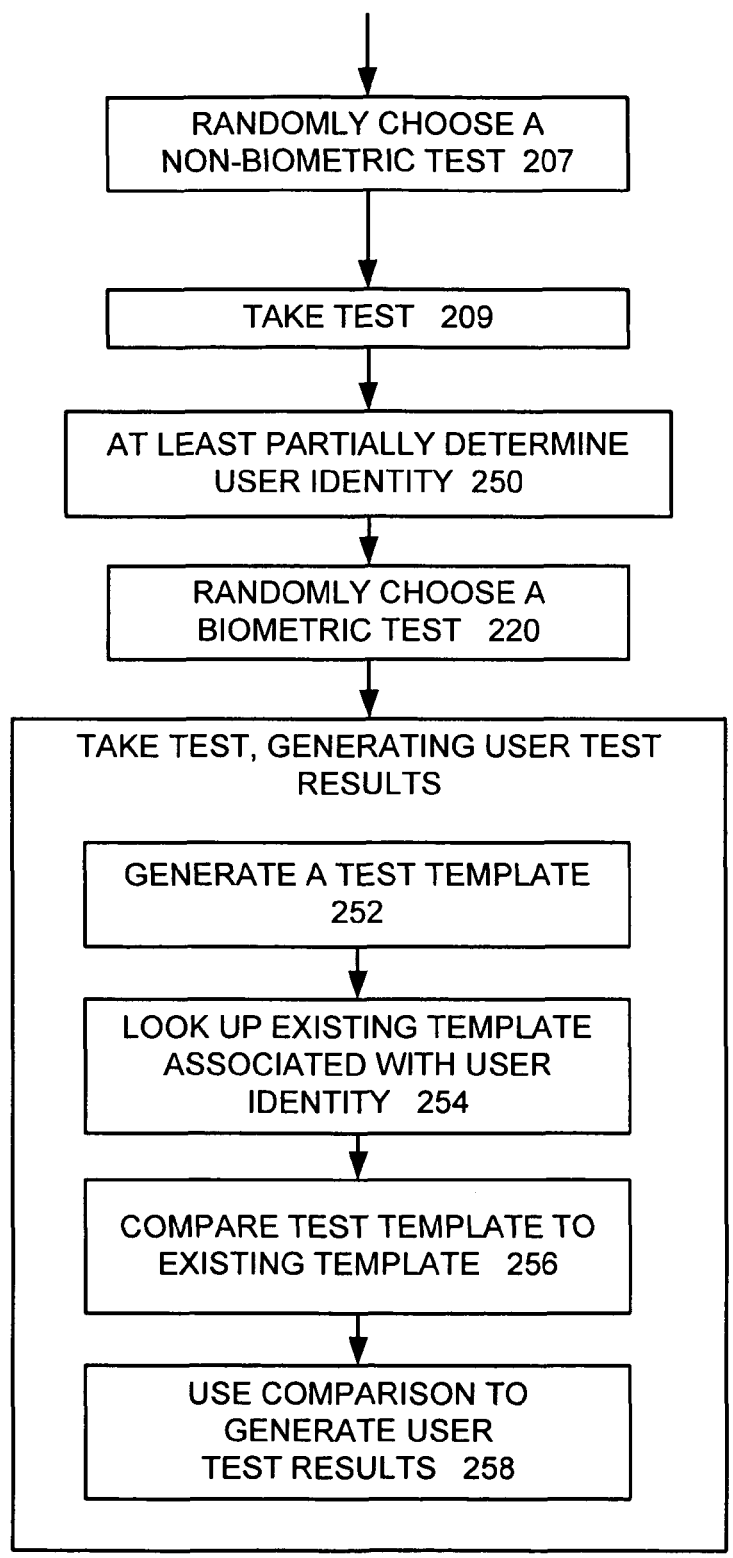
FIG. 2C is an operational flow diagram detailing an exemplary embodiment of a method of generating user test results in conjunction with which described embodiments can be implemented.

One or more initial biometric tests are then taken, at process block 222. For example, a first biometric test is taken. The details of test-taking are explained more fully in connection with FIG. 2C. As illustrated in FIG. 2C, identity can be determined (block 250) after (or during) the process of taking a non-biometric test 209. This can be easily understood by examining an exemplary process of signing into a computer system. When a user signs in, the user signs in as someone—someone who has an associated password, say. This initial password provides a clue to the expected user's identity (a "who he/she is"). This "who he/she is" can then used to simplify the biometric matching procedure (in an exemplary embodiment) by allowing a comparison of the biometrics of the user who signed in with biometrics (or a template thereof) previously acquired for the user associated with the password. In some embodiments, if the identity determined is on a "black list," then the user is denied access and is not allowed to take the biometric tests even if the non-biometric tests were passed. The user identity may be only partially determined by the initial test passed, with the identity being incrementally refined as more tests are passed successfully.

The mechanics of test taking differ with each biometric test, but generally, a representation or sample (for example, an image, a voiceprint, or in the case of keystroke dynamics, a keyboard typing behavior sample) is captured from the user attempting to be authenticated. The representation is then processed into a template 252 using various algorithms that capture essential items from the data. From the non-biometric test steps, the identity of the user who is supposedly being checked is known. The template for this user can be retrieved (block 254) from storage (e.g., in a database). The retrieved template is then compared to the test template (block 256)—the test template being from the user hoping to gain access. Since the user to whom the template should belong is already known, multiple templates do not need to be sorted through, which assists in reducing the computational energy required, as well as reducing (in an exemplary embodiment) the number of false acceptances. The number of false acceptances is reduced because a single user was established using the non-biometric testing, and the template of the user who is presenting the credentials must match one or more specific biometric patterns of the expected individual. This differs from the normal biometric testing procedure where a pattern is matched against all existing templates that might be in a database of authorized users. Finally, the comparison generates an individual test confidence score 258.

Returning to FIG. 2B, at optional process block 224 the individual test failure threshold is adjusted if the user (determined, for example, with the non-biometric tests) is a new user. All biometric tests depend on duplicating biometric data, such as, for example, face shape, hand size, fingerprint quality. Such duplication can be dependent on specific factors, such as how a user places his or her hand on a platen, how hard the pressure of a fingerprint is, and so on. Thus, users get better with time at duplicating the exact circumstance that leads to a standardized result. When a user is a beginner; that is, one who has rarely used a specific biometric device, such uniformity may be difficult to achieve. Therefore, such a user may be allowed more tries to achieve a satisfactory score, or might be allowed to pass with a lower score than otherwise acceptable—thus, the test failure threshold can be varied, such as lowered for new users and raised for repeat users. In an alternative embodiment, the scaled test score (created from the user test results and the confidence level of the specific test) is modified if the user is a beginner.

Once an individual biometric test score is generated, a user role can be more fully defined (not shown). At process block 226, test results are generated. This determines whether or not a user failed the test. If so, that is, if the test score was too low, the user can be allowed a number of chances to generate a passing score—the test failure variable. When a test is failed, a variable that keeps track of the number of times that a user failed the test is incremented at block 228, and then at decision block 230, it is determined if the user has failed the test too many times, such as the failure number has reached or exceeded a threshold. The allowed number of tests can be predetermined and can be varied, such as based upon factors such as the type of test, the usual reliability of the test, and often factors or combinations thereof. If so, then the user is denied access 232. If not, control passes to process block 222 where the user gets to try again.

Tests vary in their accuracy; some are considered very reliable (mostly those that are more invasive) and some, especially the less invasive tests, are less reliable in that they produce many false positives or false negatives. This level of confidence in a given test is captured in the confidence level, a measure of how accurate a given biometric test is. The effectiveness of biometric tests is measured, generally, by a series of rates: for example, the false acceptance rate, the false rejection rate, and the failure to enroll rate. The false acceptance rate is the likelihood that someone who is not authorized is allowed access. This directly affects security, and so is often considered the most relevant measure. The false rejection rate is the likelihood that someone who is authorized is denied access. While not directly impacting security (the denial of access to an authorized user is not a security breach), it is quite annoying for those denied access. The failure to enroll rate gives the proportion of people who are unable to become enrolled initially on a system. The confidence level can be determined, for example, by using a combination of these test measures. Although other approaches are usable, in one example, the confidence level can be set at the point where the false rejection rate and the false acceptance rate are equal.

If the user did not fail the test, then the results of the individual test and a confidence level associated with the test can be combined to produce a scaled test score at block 234. The scaled test score can then be combined, such as added to any prior test scores to produce an aggregate biometric confidence score at block 236. In a specific example, the aggregate score can be the sum of the scaled test scores of all the biometric tests that have been previously passed by this user in this session.

If the resulting aggregate biometric confidence score is high enough at block 238, then the user is allowed access at block 242. If not, then the number of biometric tests that have previously been taken can be considered at block 240. If too many have been taken, then the user is considered to have failed, and access is denied at block 244.

Figure 3:
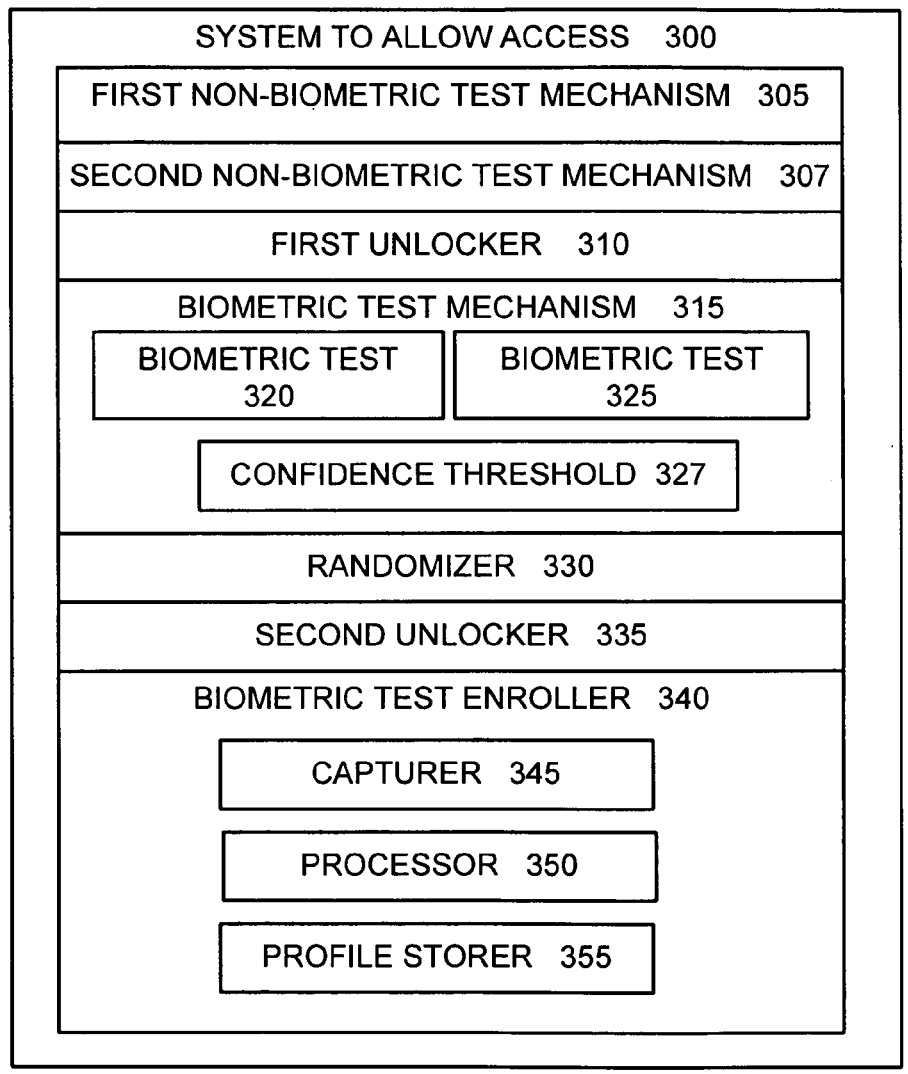
FIG. 3 is a functional block diagram illustrating an embodiment of an example system to allow access in conjunction with which described embodiments can be implemented.

III. Exemplary System for Allowing Access Using Non-Biometric and Biometric Tests Referring to FIG. 3, block diagram of a system to allow access 300 shows an exemplary embodiment of the systems discussed herein.

The system to allow access 300 comprises or consists of a first non-biometric tester 305. In an exemplary embodiment, a user must pass at least one and desirably one non-biometric test associated with this test mechanism. The same biometric tests can be used as have been described previously: generally, a non-biometric test produces a pass or a fail—for example, the user either knows a password or a PIN, or does not. Similarly, either a Smart card or similar device has the appropriate secret or it does not. In some embodiments, at least one second non-biometric test mechanism 307 must also be correctly handled by a user prior to a first unlocker 310 being activated.

The first unlocker 310 in this embodiment allows limited access. Access can be allowed, for example, only to the next level of testing, or partial access can be allowed to a formerly forbidden zone: for example, a car door or room door can be unlocked, certain otherwise-restricted computer files may be viewed, and so on.

A biometric tester mechanism 315 is also included in this embodiment. This mechanism 315 desirably comprises at least one biometric test 320, and a confidence threshold 327, which can be a combined, e.g., cumulative, score on the taken biometric tests that a user must reach before he or she is allowed access. In an exemplary embodiment, the at least one non-biometric test preliminarily identifies a specific user. This user is expected to have at least one biometric template or profile on store. When the biometric tester 315 attempts to authenticate the user, it checks only for previously-stored templates for that specific user. In an alternate embodiment, the biometric tester mechanism 315 comprises at least two biometric tests 320, 325. These two biometric tests can be, for example, fingerprint tests for different fingers on the hands.

Figure 4:
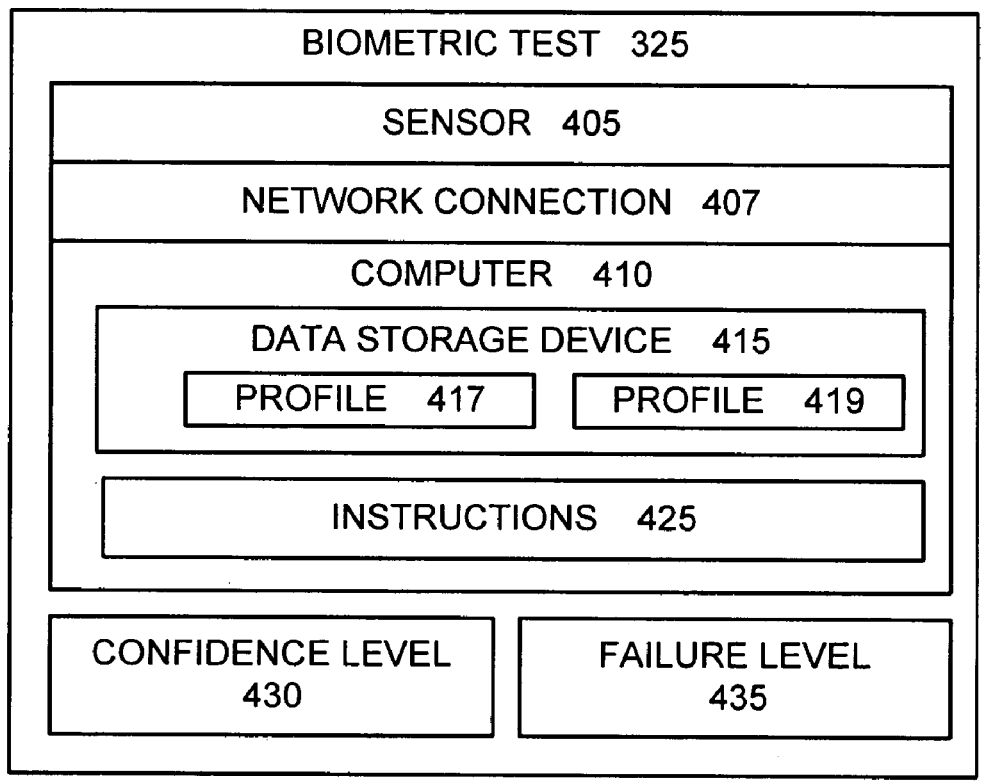
FIG. 4 is a functional block diagram illustrating an embodiment of an example biometric test in conjunction with which described embodiments can be implemented.

An embodiment of an exemplary biometric test is shown more fully in FIG. 4. A sensor 405, and a computer 410 perform an exemplary biometric test 325. The sensor 405 is used to take the biometric sample and can comprise, for example, an optical sensor such as a camera, an ultrasonic sensor, a thermal sensor, or other biometric sample capturing mechanism. The computer 410 and the sensor 405 can be interconnected by a network connection 407, which, for example, can be wireless, an Ethernet connection, and so forth. The computer 410 itself can contain a data storage device 415 within which data associated with various issues, such as profiles 417 and 419 of the various users that can be authenticated by the system are stored. Furthermore, a series of instructions 425 can be contained within the data storage device 415 for use in matching data taken from the sensor with the stored profiles.

How close the match is between sample biometric data derived from the sensor 405 and at least one profile 417, 419 determines a test score that is used in conjunction with the confidence level to determine how well the person whose biometric data was sampled by the sensor 405 scored on the biometric test 325. The confidence level 430 is a measure of how accurate the given biometric test is and can be, for example, be set at or based upon the equal error rate: the point where the false acceptance rate (FAR) and the false rejection rate (FRR) are equal. Each test can also have a failure level 435 associated with it. If the match score between the user data and the profile data falls below the failure level 435, then the user is considered to have failed the test, and can be denied access by the second unlocker 335 of FIG. 3. As the identity of the user was preferably established by the first non-biometric tester 305, the system preferably only checks previously-stored templates correlated with the user preliminarily identified by the non-biometric tester 305.

Returning to FIG. 3, a randomizer 330 is also desirably included. The randomizer 330 can be used to randomly determine which biometric test (and in some embodiments) which non-biometric test to present to a user. A second unlocker 335 is used to grant additional or full access when the confidence threshold 327 has been reached—that is, for example, when at least two biometric tests have been taken and their cumulative score is equal to or greater than the confidence threshold 327.

The profiles 417 and 419 (in FIG. 4) used by the biometric test 325 can be initially input into the system. This can be performed by a biometric test enroller 340. When an authorized user initially enrolls onto a given biometric test system, first a data sample can be captured with a biometric sensor or biometric data capturer 345. This can, for example, be done using the sensor 405 or an alternative sensor or device. The data can then be processed by a processor 350 to extract (or create) data points that will be used in the user profile (e.g., 417, 419). These data points, often called a template, are then desirably stored by the storer 355, for later use by the instructions 425, for instance, to compare to a new test sample with the stored template for the test to determine if a sufficiently-close match has been made.

Figure 5:
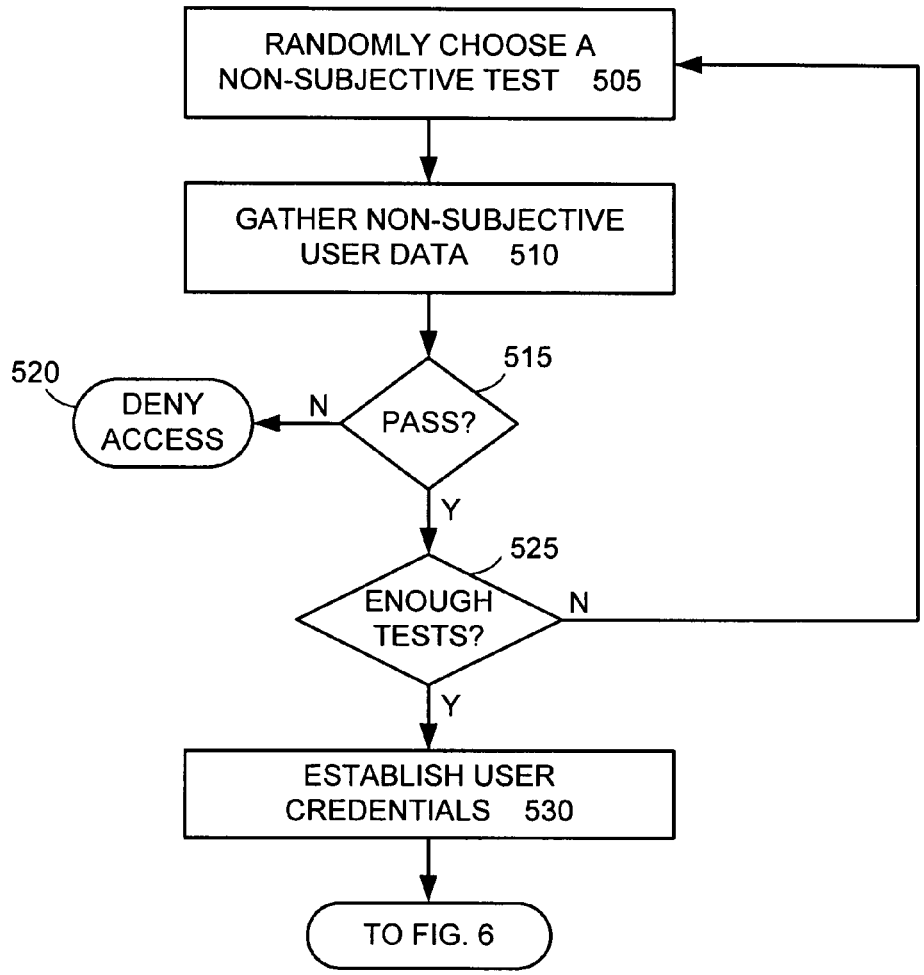
FIG. 5 is an operational flow diagram illustrating an exemplary process for establishing user credentials in conjunction with which described embodiments can be implemented.
Figure 6:
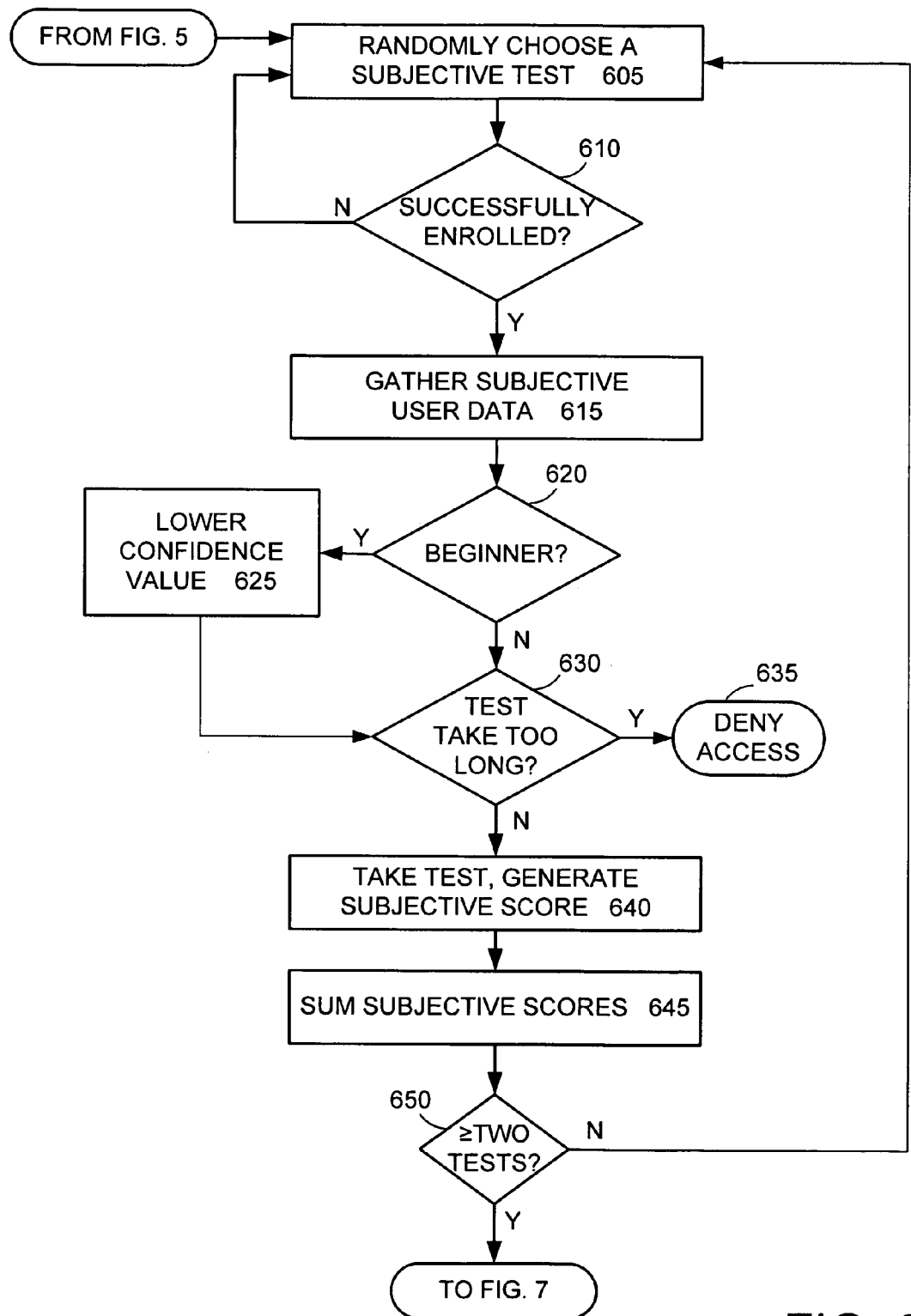
FIG. 6 is an operational flow diagram illustrating an exemplary process for establishing user identity in conjunction with which described embodiments can be implemented.
Figure 7:
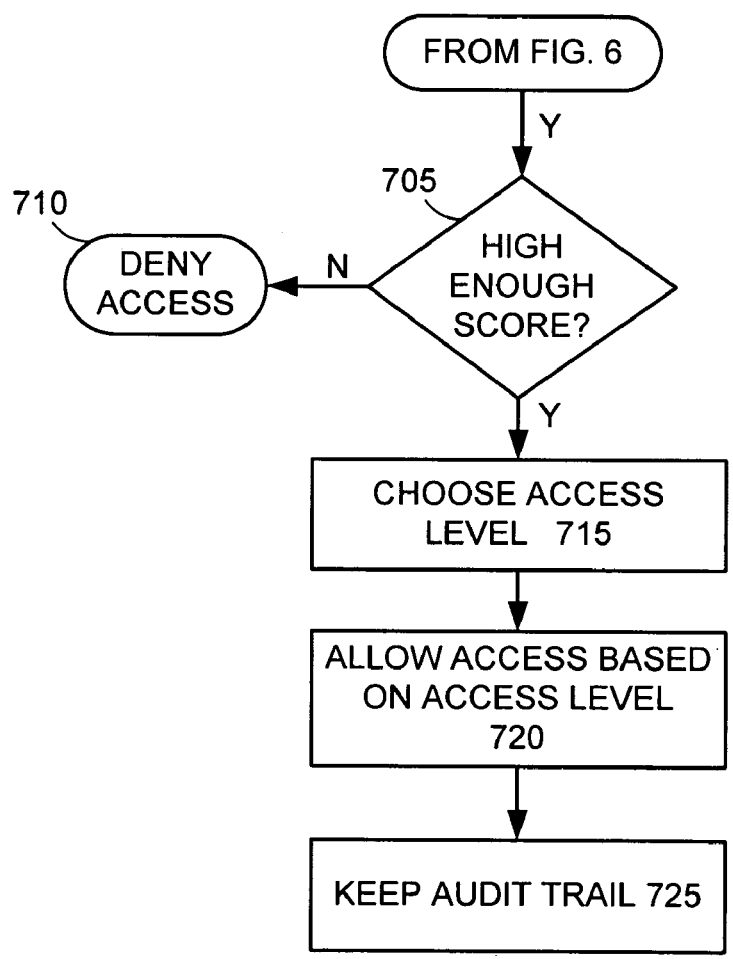
FIG. 7 is an exemplary operational flow diagram that extends the process for establishing user identity shown in FIG. 6, above.

IV. Exemplary Method for Allowing Access Using Subjective and Non-Subjective Data FIGS. 5, 6, and 7 are an operational flow diagram illustrating an exemplary process for allowing access. The process begins at step 505 where at least one and desirably one non-biometric test is chosen, desirably randomly. At process block 510 non-biometric data is gathered. Non-biometric data can be data that is not dependent upon human physiological characteristics to establish identity, and is therefore, can be deemed non-subjective. In contrast, biometric tests are typically dependent on human physiological characteristics and hence, can be deemed subjective in nature. Furthermore, non-subjective non-biometric tests are generally binary, in that they are either passed or failed. At process block 515 the non-biometric data is used to determine whether the one or more tests were passed or failed. For example, was a PIN entered correctly? Or, did a Smart card contain the correct authorization such as and not limited to one based on cryptography? If a test was failed, then, generally, the user is denied access at block 520. Alternatively, more than one chance to pass may be given.

In some embodiments, at least two non-subjective tests must be passed before being allowed to move onto the next level of authentication. In such a system, at decision block 525, it is determined if sufficient non-subjective tests have been passed. If not, then control returns to step 505 where more non-biometric test data is gathered. If sufficient tests have been passed, then credentials (at block 530) for this user are considered established.

As shown in FIG. 6, in this example, once the credentials are established, the user is then allowed to undertake a series of subjective tests, such as biometric tests, to establish identity. At process block 605 a biometric test is chosen, desirably randomly. Not all people have success in enrolling in every biometric test. If the quality of the data they generate in response to a biometric test makes it impossible to generate a useable matching template, then they cannot be authenticated by that test. The percentage of people unable to enroll on a given test is known as the failure to enroll rate (FEE). At decision block 610, it is checked if the user whose credentials were established earlier was able to successfully enroll in the chosen biometric test. If they were not able to, then control continues at process 605, and a different biometric test is chosen, for example randomly. If they were able to successfully enroll, then control continues at process block 615, where biometric information is gathered and processed, desirably, into a user authorization template.

As has been discussed, biometric information can be gathered in a number of ways. To give one example, some fingerprint systems require a user to press their fingerprint against a platen. The system then captures an image of the print, runs the image through a series of digital processing algorithms to remove any extraneous features such as scars, abrasions, and cuts. A "skeletal image" is then generated which codes defining fingerprint features such as bifurcations, end points, and the placement of ridges, arches, loops, and whorls. All of this information can then be encoded, such as into an individualized representation—an authorization template. Certain other "anti-theft" techniques may be used. For example, the platen may record a temperature ensuring that a valid live finger is presented; not a copy, not a detached finger. Other biometric mechanisms can also be used to enhance the reliability or to ensure that the actual human possessing the biometric quality being tested has given the sample.

At decision block 620, it is desirably determined if the current user is a beginner. If not, the process continues at decision block 630. If so, as seen at process block 625, a confidence value associated with this test, or with the biometric testing procedure as a whole can be lowered. The process continues at decision block 630.

Oftentimes, problems with tests arise. For example, a platen used for fingerprint tests may be smeared with grime, someone's hands may not be clean, and so on. Due to these factors, biometric tests are often given multiple times in the same round of testing before an adequate sample is obtained. However, there is often a limited amount of time, or a limited number of retests that are allowed before a user is considered to have failed the test. At decision block 630, it is determined if too much time has elapsed. If so, then, at process block 635, access is denied. The time limit can be a predetermined threshold time and can be varied. Otherwise, the process continues at process block 640.

At process 640, a subjective test score is generated. The user authorization template generated at process block 615 is compared to a stored template generated by the authorized user during an enrollment process. How close the two match is reflected in a confidence score. In an alternative embodiment, the user authorization template is compared to a database of many, or all authorized users. Many different techniques have been developed to partition template groups to avoid a system having to conduct an exhaustive search through a database. For example, fingerprints are often classified into certain class types. If such a hierarchical classification system were to be used, only those stored templates in the associated class type would be expected to be searched to find the closest match.

At process block 645, all of the previous subjective score and the current score desirably are desirably combined, such as summed. Other methods of combination can also be used. For example, some test scores may be weighted more heavily than others. At decision block 650, it is determined if a sufficient number of subjective tests have been taken. The number of tests taken can be varied and can be made dependent upon a given implementation and the level of security desired. However, desirably at least two tests are taken. If insufficient tests have been taken, then control passes back to process block 605, where another subjective test is randomly or otherwise chosen. If enough tests have been taken, then control passes to decision block 705 (in FIG. 7). At decision block 705 it is determined if the combined score on the subjective tests has reached a desired confidence threshold, which can be previously determined. If not, that is, if the score is insufficiently high, control passes to process block 710 where access is denied. Otherwise, control passes to process block 715. In alternative embodiments, the user is given another chance or chances to take one or more other subjective tests. Only after too many (e.g., a maximum number of tests) subjective tests have been given and failed is access denied.

At optional process block 715, a level of access is chosen for the now-authorized user. At process block 720, access is allowed based on the access level associated with the authorized user. In some embodiments, an audit trail is kept of the authorized users file accesses, movements, etc., as shown at process block 725.

V. Exemplary Embodiment Involving a Vehicle

An automobile is given as an example alternative embodiment. The automobile would be fitted with a host computer system, (or an existing computer already on the vehicle can be used) which would store a part of the biometric and non-biometric information while some other part can be stored with the user or users. For example, a user may have a Smart card, which has the user's fingerprint template stored on it. In such a case, the host computer system would compare the fingerprint of the user attempting to gain access with a template not stored on the host computer system, but rather stored on the Smart card itself.

In this embodiment, one or more non-biometric tests are done initially, followed by one or more and desirably at least two biometric tests. The non-biometric and the first level biometric tests are desirably done outside the automobile itself. After the non-biometric and first level biometric tests have been passed, in one embodiment, the automobile unlocks, allowing the user desiring access to enter the vehicle. Then, the second level of biometric tests are conducted inside the automobile.

In one embodiment, the user can be presented with a Smart card that stores a secret, which might be a password, a key, a digital signature, and so on, also known to the host computer on the automobile. Using a vicinity or proximity mechanism, as soon as the user approaches the automobile, the automobile doors are unlocked giving the user (card carrier) access to the inside of the automobile. Storage space in the automobile (such as the trunk of the car and/or a glove compartment) may be subjected to an additional test, such as a PIN based authentication. As soon as the user is out of the range for the vicinity reader (typically, one to two meters), the automobile can be locked automatically. Another unauthorized user, who is carrying a similar Smart card, cannot get the access to inside, as the specific secret used to unlock the car is not known to him. The secrets may be assigned by the user initially or may be issued to the user. The user identified by the non-biometric test, in an exemplary embodiment, is assigned a role. This role can be "primary driver" which allows access to essentially all of the automobile features, can be "juvenile" which allows access only to the interior of the vehicle, "trunk only" which only allows access to the trunk, "time restricted" which only allows access for a specific time period, such as access is allowed between two dates or access is allowed for a set time period after the initial access, say two hours, a week, etc; or it can be some other role.

After initially receiving access to the inside of the automobile, a user in this example still needs to perform a biometric authentication to obtain the driving access to the automobile. There may be more than one such user who can be authenticated to drive.

In another automobile system with greater access control, one or more biometric tests may also be combined with one or more non-biometric tests to get the access to the inside. In such a case, for example, a fingerprint reader may be attached to the door handle so that a user when he tries to open the door may be automatically authenticated.

The entire system can be subjected to one or more additional levels of biometric tests, which can comprise one or more of the following:

Retina scanning and generation of the unique number (this can be made mandatory)
Eye blinking rate
Eye ball squint extent test, and/or
Normalized body temperature test One or more additional biometric tests can be required to be performed once the inside access is permitted. The inside of the vehicle non-biometric or biometric test or tests can be more elaborate than the initial non-biometric or biometric test or tests. After a successful authentication, the user can be permitted to drive the car.

Failure at any level of the authentication can result in one or more of the following:
No further access is allowed to vehicle controls (this can be mandatory)
Initiating one or more security alarm features (e.g., audible and visual alarms, alerting a remote monitoring company,) and/or
Locking and disablement of the basic level functions allowed after the first level.

VI. Computing Environment

Figure 8:
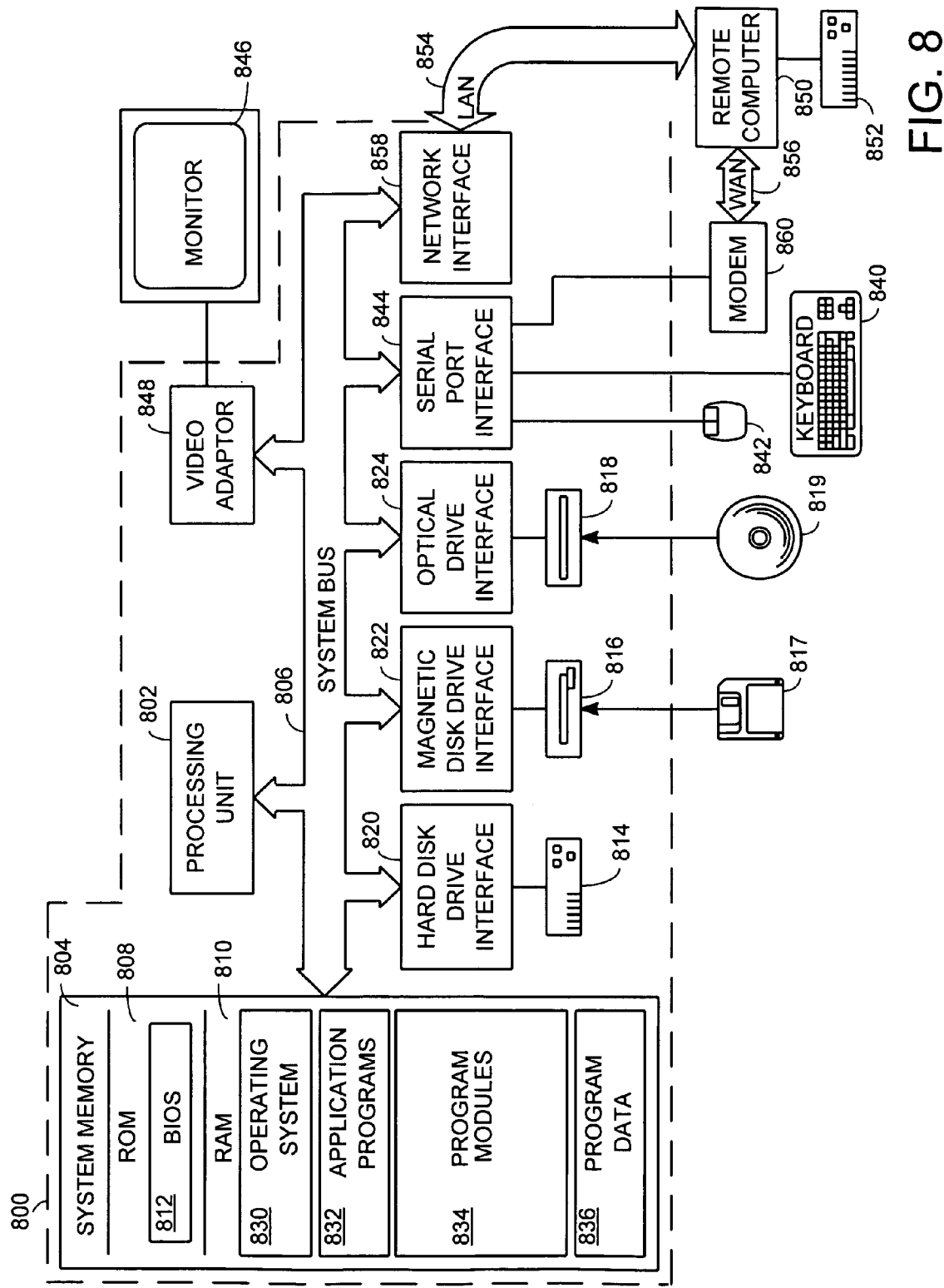
FIG. 8 is a block diagram of an exemplary computing environment in conjunction with which described embodiments can be implemented.

With reference to FIG. 8, an exemplary system for implementing at least portions of the disclosed technology includes a general purpose computing device in the form of a conventional computer 800, which can be a PC, or a larger system, including a processing unit 802, a system memory 804, and a system bus 806 that couples various system components, including the system memory 804, to the processing unit 802. The system bus 806 can be any of several types of bus structures, including a memory bus or memory controller, a peripheral bus, and a local bus using any of a variety of bus architectures. The system memory 804 desirably includes read only memory (ROM) 808 and random access memory (RAM) 810. A basic input/output system (BIOS) 812, containing the basic routines that help with the transfer of information between elements within the computer 800, is stored in ROM 808.

The computer 800 desirably further includes one or more of a hard disk drive 814 for reading from and writing to a hard disk (not shown), a magnetic disk drive 816 for reading from or writing to a removable magnetic disk 817, and an optical disk drive 818 for reading from or writing to a removable optical disk 819 (such as a CD-ROM or other optical media). The hard disk drive 814, magnetic disk drive 816, and optical disk drive 818 (if included) are connected to the system bus 806 by a hard disk drive interface 820, a magnetic disk drive interface 822, and an optical drive interface 824, respectively. The drives and their associated computer-readable media provide nonvolatile storage of computer-readable instructions, data structures, program modules, and other data for the computer 800. Other types of computer-readable media which can store data that is accessible by a computer, such as magnetic cassettes, flash memory cards, digital video disks, CDs, DVDs, RAMs, ROMs, and the like (none of which are shown), can also be used in the exemplary operating environment.

A number of program modules can be stored on the hard disk 814, magnetic disk 817, optical disk 819, ROM 808, or RAM 810, including an operating system 830, one or more application programs 832, other program modules 834, and program data 836. Program modules 834 to perform both non-biometric testing and biometric testing can be among those stored on the hard disk 814. There can also be modules 834 to initially enroll authorized users. A user can enter commands and information into the computer 800 through input devices, such as a keyboard 840 and pointing device 842 (such as a mouse). Other input devices (not shown) can include a digital camera, microphone, joystick, game pad, satellite dish, scanner, or the like (also not shown). These and other input devices are often connected to the processing unit 802 through a serial port interface 844 that is coupled to the system bus 806, but can be connected by other interfaces, such as a parallel port, game port, or universal serial bus (USB) (none of which are shown). A monitor 846 or other type of display device is also connected to the system bus 806 via an interface, such as a video adapter 848. Other peripheral output devices, such as speakers and printers (not shown), can be included.

The computer 800 can operate in a networked environment using logical connections to one or more remote computers 850. The remote computer 850 can be another computer, a server, a router, a network PC, or a peer device or other common network node, and typically includes many or all of the elements described above relative to the computer 800, although only a memory storage device 852 has been illustrated in FIG. 8. The logical connections depicted in FIG. 8 include a local area network (LAN) 854 and a wide area network (WAN) 856. Such networking environments are commonplace in offices, enterprise-wide computer networks, intranets, and the Internet.

When used in a LAN networking environment, the computer 800 is connected to the LAN 854 through a network interface 858. When used in a WAN networking environment, the computer 800 typically includes a modem 860 or other means for establishing communications over the WAN 856, such as the Internet. The modem 860, which can be internal or external, is connected to the system bus 806 via the serial port interface 844. In a networked environment, program modules depicted relative to the computer 800, or portions thereof, may be stored in the remote memory storage device 852. The network connections shown are exemplary, and other means of establishing a communications link between the computers can be used.

Having described and illustrated the principles of our technology with reference to the illustrated embodiments, it will be recognized that the illustrated embodiments can be modified in arrangement and detail without departing from such principles.

Elements of the illustrated embodiment shown in software may be implemented in hardware and vice-versa. Also, the technologies from any example can be combined with the technologies described in any one or more of the other examples. Also, the flow charts are all exemplary and various actions within them can occur in other orders or may be deleted altogether. For example, in FIG. 2B, the decision blocks 238 and 240 can be swapped, and blocks 228 and 230 are both optional.

In view of the many possible embodiments to which the principles of the technology may be applied, it should be recognized that the illustrated embodiments are examples and should not be taken as a limitation on the scope of the invention. For instance, various components of systems and tools described herein may be combined in function and use. We, therefore, claim as our invention all subject matter that comes within the scope and spirit of these claims.

We claim:

1. A method of determining user access for a user having a user role, the method comprising:
combining, using a computer, test scores for first and second non-biometric tests to meet or exceed a non-biometric confidence threshold;
receiving, using the computer, a test score for a first biometric test for the user;

making a first determination, using the computer and based at least in part on the test score for the first biometric test, that a biometric confidence threshold has not been reached;

as a result of the first determination and using the computer, presenting a second biometric test to the user;

making a second determination, using the computer and based at least in part on a combination of the test score for the first biometric test for the user and a test score for the second biometric test, whether the biometric confidence threshold has been met or exceeded; and determining, using the computer and as a result of the second determination, a level of access based at least in part on the user role in the event both the non-biometric and biometric confidence thresholds have been met or exceeded for the user, wherein at least one of the first or second biometric tests has an associated biometric test confidence level, wherein the at least one of the first or second biometric tests has a biometric user test result, wherein an individual biometric test confidence score is a combination of the biometric test confidence level and the biometric user test result, wherein the at least one of the first or second biometric tests has a biometric test failure threshold, wherein, if the biometric user test result is below the biometric test failure threshold, the user fails the at least one of the first or second biometric tests, and wherein the biometric test failure threshold is based in part on the biometric test confidence level of a preceding biometric test.

2. A method of allowing user access to a user having a role, the method comprising:

combining, using a computer, individual non-biometric scores from plural non-biometric user tests taken by the user until a non-biometric confidence threshold is met or exceeded;

combining, using the computer, individual biometric test scores of plural biometric user tests taken by the user until a biometric confidence threshold is met or exceeded; and allowing, using the computer, a level of access based in part upon the user's role in the event both the non-biometric and biometric confidence thresholds have been met or exceeded for the user, wherein at least one of the biometric user tests has an associated biometric test confidence level, wherein the at least one of the biometric user tests has a biometric user test result, wherein an individual biometric test confidence score is a combination of the biometric test confidence level and the biometric user test result, wherein the at least one of the biometric user tests has a biometric test failure threshold, wherein, if the biometric user test result is below the biometric test failure threshold, the user fails the at least one biometric user test, and wherein the biometric test failure threshold is based in part on the biometric test confidence level of a preceding biometric user test.

3. The method of claim 2, wherein the user's role is incrementally defined based at least in part by the incremental individual non biometric scores and the incremental individual biometric test scores.

4. The method of claim 1, the second determination comprising a determination that a biometric test limit for the user has been exceeded and a determination that the biometric confidence threshold has not been reached, the level of access comprising no access for the user.

5. The method of claim 4, further comprising changing the biometric test limit.

6. The method of claim 2 wherein the biometric test failure threshold is related to how many times the at least one of the biometric user tests has been taken by the user.

7. The method of claim 2, wherein the user's role is at least partially defined by at least one of the individual non-biometric scores or at least one of the individual biometric test scores.

8. The method of claim 2, further comprising determining the biometric test failure threshold at least in part based upon the biometric test confidence level of at least one of the biometric user tests.

9. The method of claim 4, further comprising triggering an alarm based on the second determination.

10. The method of claim 2 wherein the plural non-biometric user tests are chosen from a group comprising: inputting a password, inputting a Smart card containing a digital certificate or a predefined secret, possessing a contactless card containing a digital circuit, inputting a USB token device, inputting a bio-token device, using a soft-token device, and showing an ID.

11. The method of claim 2 wherein the plural biometric user tests are chosen from a group comprising at least two of: a fingerprint recognition test of a specific finger or thumb, a fingerprint recognition test of a different specific finger or thumb, a handprint recognition test, a face recognition test, a handwriting recognition test, a voice recognition test, an iris recognition test, an eye blinking rate test, an eyeball squint extent test, a normalized body temperature test, a keystroke dynamic test, a vein recognition test, and a DNA recognition test.

12. The method of claim 2, wherein at least one of the first and second non-biometric tests comprises determining a user identity, and wherein at least one of the first and second biometric tests comprises comparing a test template generated by the user with a stored template associated with the user identity to determine the individual biometric test confidence score.

13. The method of claim 2, wherein the allowing a level of access comprises at least one of allowing movement in a formerly restricted location, allowing access to a formerly restricted computer file, allowing access to a formerly restricted computer function, allowing access to at least a portion of a formerly restricted device, or allowing access to at least a portion of a formerly restricted system.

14. The method of claim 1, further comprising:

making a third determination, based at least in part on the test score for the first non-biometric test completed by the user, that the non-biometric confidence threshold has not been reached by the user; and as a result of the third determination and using the computer, receiving the test score for the second non-biometric test completed by the user.

15. One or more non-transitory computer-readable storage media having encoded thereon instructions which, when executed by a computer, cause the computer to perform a method, the method comprising:

combining, using the computer, test scores for first and second non-biometric tests to meet or exceed a non-biometric confidence threshold;

receiving, using the computer, a test score for a first biometric test for the user;

making a first determination, using the computer and based at least in part on the test score for the first biometric test, that a biometric confidence threshold has not been reached;

as a result of the first determination and using the computer, presenting a second biometric test to the user;

making a second determination, using the computer and based at least in part on a combination of the test score for the first biometric test for the user and a test score for the second biometric test, the second determination comprising whether the biometric confidence threshold has been met or exceeded; and determining, using the computer and at least partially as a result of the second determination, a level of access based at least in part on the user role in the event both the non-biometric and biometric confidence thresholds have been met or exceeded for the user, wherein at least one of the first or second biometric tests has an associated biometric test confidence level, wherein the at least one of the first or second biometric tests has a biometric user test result, wherein an individual biometric test confidence score is a combination of the biometric test confidence level and the biometric user test result, wherein the at least one of the first or second biometric tests has a biometric test failure threshold, wherein, if the biometric user test result is below the biometric test failure threshold, the user fails the at least one of the first or second biometric tests, and wherein the biometric test failure threshold is based in part on the biometric test confidence level of a preceding biometric test.

16. The one or more non-transitory computer-readable storage media of claim 15, the second determination comprising a determination that a biometric test limit for the user has been exceeded and a determination that the biometric confidence threshold has not been reached, the level of access comprising no access for the user.

17. The one or more non-transitory computer-readable storage media of claim 15, the test score for the first biometric test being based at least in part on a biometric test confidence level of a previous biometric test.

18. The one or more non-transitory computer-readable storage media of claim 15, wherein a difficulty of passing at least one of the first or second biometric tests is related to a number of times that the user has taken the at least one of the first or second biometric tests.

19. The one or more non-transitory computer-readable storage media of claim 15, the method further comprising:
making a third determination based at least in part on the test score for the first non-biometric test completed by the user, that the non-biometric confidence threshold has not been reached by the user; and
as a result of the third determination and using the computer, receiving the test score for the second non-biometric test completed by the user.

20. The one or more non-transitory computer-readable storage media of claim 15, wherein at least one of the first biometric test and the second biometric test comprises comparing a test template generated by the user in response to the test with a stored template associated with the user.

21. A system, comprising:
a processor; and
one or more computer-readable storage media having encoded thereon instructions which, when executed by the processor, cause the processor to perform a method, the method comprising:
combining test scores for first and second non-biometric user tests to meet or exceed a non-biometric confidence threshold:
receiving a test score for a first biometric test for the user;
making a first determination, based at least in part on the test score for the first biometric test, that a biometric confidence threshold has not been reached;
as a result of the first determination, presenting a second biometric test to the user;
making a second determination, based at least in part on a combination of the test score for the first biometric test for the user and a test score for the second biometric test, the second determination comprising whether the biometric confidence threshold has been met or exceeded; and
determining, at least partially as a result of the second determination, a level of access based at least in part on the user role in the event both the non-biometric and biometric confidence thresholds have been met or exceeded for the user, wherein at least one of the first or second biometric tests has an associated biometric test confidence level, wherein the at least one of the first or second biometric tests has a biometric user test result, wherein an individual biometric test confidence score is a combination of the biometric test confidence level and the biometric user test result, wherein the at least one of the first or second biometric tests has a biometric test failure threshold, wherein, if the biometric user test result is below the biometric test failure threshold, the user fails the at least one of the first or second biometric tests, and wherein the biometric test failure threshold is based in part on the biometric test confidence level of a preceding biometric test.

* * * * *